(12) United States Patent
Dickerson et al.

(10) Patent No.: US 10,995,899 B1
(45) Date of Patent: *May 4, 2021

(54) BUCKET CADDY

(71) Applicant: Rukket, LLC, Wilmington, DE (US)

(72) Inventors: Ryan L. Dickerson, Athens, GA (US); Jarrett Wiesolek, Cedarburg, WI (US)

(73) Assignee: Rukket, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/904,863

(22) Filed: Jun. 18, 2020

Related U.S. Application Data

(63) Continuation-in-part of application No. 16/374,799, filed on Apr. 4, 2019, now Pat. No. 10,729,963.

(Continued)

(51) Int. Cl.
| | |
|---|---|
| *F16M 11/16* | (2006.01) |
| *F16M 11/04* | (2006.01) |
| *F16M 11/32* | (2006.01) |
| *A63B 47/00* | (2006.01) |
| *A63B 67/00* | (2006.01) |

(Continued)

(52) U.S. Cl.
CPC ............ *F16M 11/16* (2013.01); *A63B 47/00* (2013.01); *F16M 11/041* (2013.01); *F16M 11/245* (2013.01); *A63B 63/00* (2013.01); *A63B 67/00* (2013.01); *A63B 71/023* (2013.01); *F16M 11/242* (2013.01)

(58) Field of Classification Search
CPC .... F16M 11/16; F16M 11/041; F16M 11/242; F16M 11/245; F16M 11/32; F16M 13/00; A63B 47/00; A63B 71/023; A63B 67/06
See application file for complete search history.

(56) References Cited

U.S. PATENT DOCUMENTS

| | | |
|---|---|---|
| 196,386 A | 10/1877 | Sprague |
| 1,371,263 A | 3/1921 | Reed |

(Continued)

OTHER PUBLICATIONS

PowerNet ball caddy—https://www.amazon.com/PowerNet-Baseball-Softball-Portable-Baseballs/dp/B0145BPQ9O/ref=sr_1_1?dchild=1 &keywords=B0145BPQ9O&qid=1603914876&sr=8-1&th=1 (indicated as first sold in 2014).

*Primary Examiner* — Tan Le
(74) *Attorney, Agent, or Firm* — Rogowski Law LLC

(57) ABSTRACT

A bucket caddy stably holds a bucket or container above a horizontal support surface or ground for easier access to the contents of the bucket or container. The bucket caddy has a retainer with slots into which at least three legs are movably joined. The legs each have a shelf surface and a hook (U-shaped or crimped) or upstanding wall disposed at their proximal ends. When splayed apart, the shelf surfaces point radially inwardly toward the retainer with their top surfaces in a common plane onto which the bottom of the bucket may be positioned. The hooks receive straps or elastic bands, each of which has a fastener at its opposite end adapted to join a portion of a rim of the bucket. Length-adjustable means are associated with straps that are not elastic. Alternatively, belts or screws provide three point connection between the legs and the sidewall of the bucket. After the bucket or container is separated from the caddy, the legs rotate so that their central axes are parallel or substantially parallel to one another in a storage configuration. A hook and loop fastener tape wraps around the legs in the storage configuration.

23 Claims, 14 Drawing Sheets

Related U.S. Application Data

(60) Provisional application No. 62/676,048, filed on May 24, 2018.

(51) Int. Cl.
*F16M 11/24* (2006.01)
*A63B 71/02* (2006.01)
*A63B 63/00* (2006.01)

(56) References Cited

U.S. PATENT DOCUMENTS

| | | | | |
|---|---|---|---|---|
| 2,190,623 | A | | 2/1940 | Benson |
| 2,749,147 | A | * | 6/1956 | Herrschaft ............... A47B 3/12 |
| | | | | 248/431 |
| 2,841,352 | A | * | 7/1958 | Pappas .................... F16M 11/22 |
| | | | | 108/157.18 |
| 4,398,690 | A | | 8/1983 | Rutledge |
| 6,723,907 | B2 | * | 4/2004 | Sato ....................... G10D 13/02 |
| | | | | 84/421 |
| 6,814,333 | B1 | | 11/2004 | Freiburger |
| 7,896,350 | B2 | | 3/2011 | Harries |
| 8,444,097 | B2 | | 5/2013 | Morrow |
| 9,220,339 | B1 | * | 12/2015 | Chen ..................... A63B 47/00 |
| 9,617,806 | B2 | * | 4/2017 | Fey ........................ E21B 19/18 |
| 10,729,963 | B1 | * | 8/2020 | Dickerson ............... A63B 47/00 |
| 2003/0150964 | A1 | | 8/2003 | Sherer |
| 2003/0169389 | A1 | | 9/2003 | Miyachi |

* cited by examiner

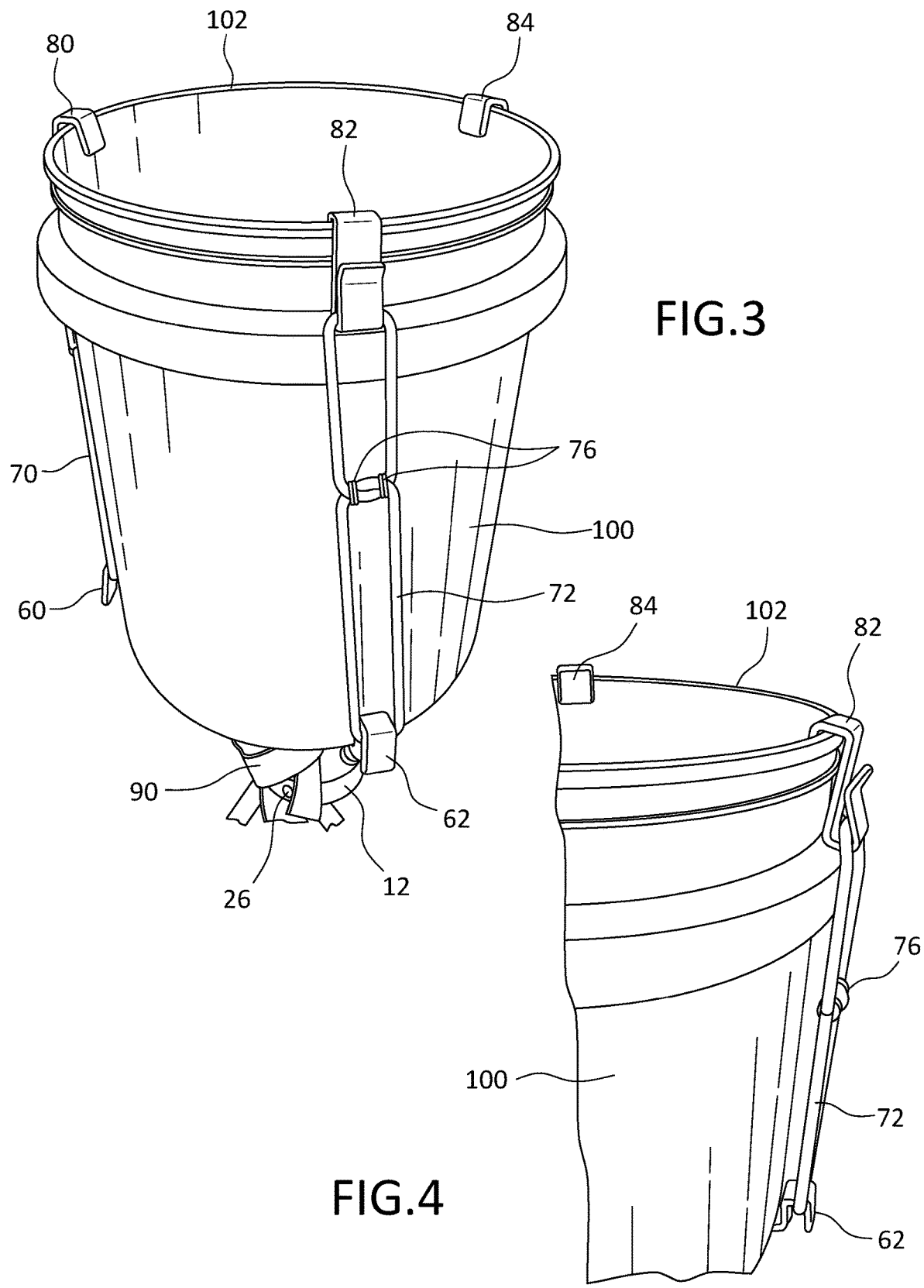

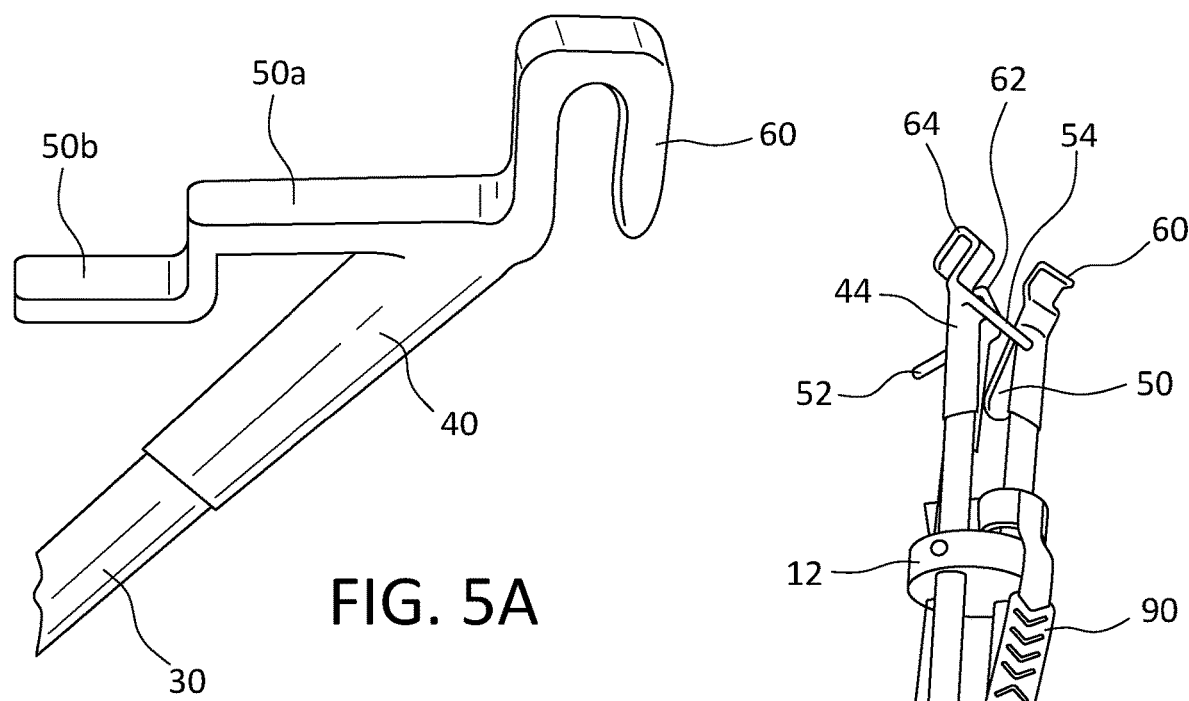
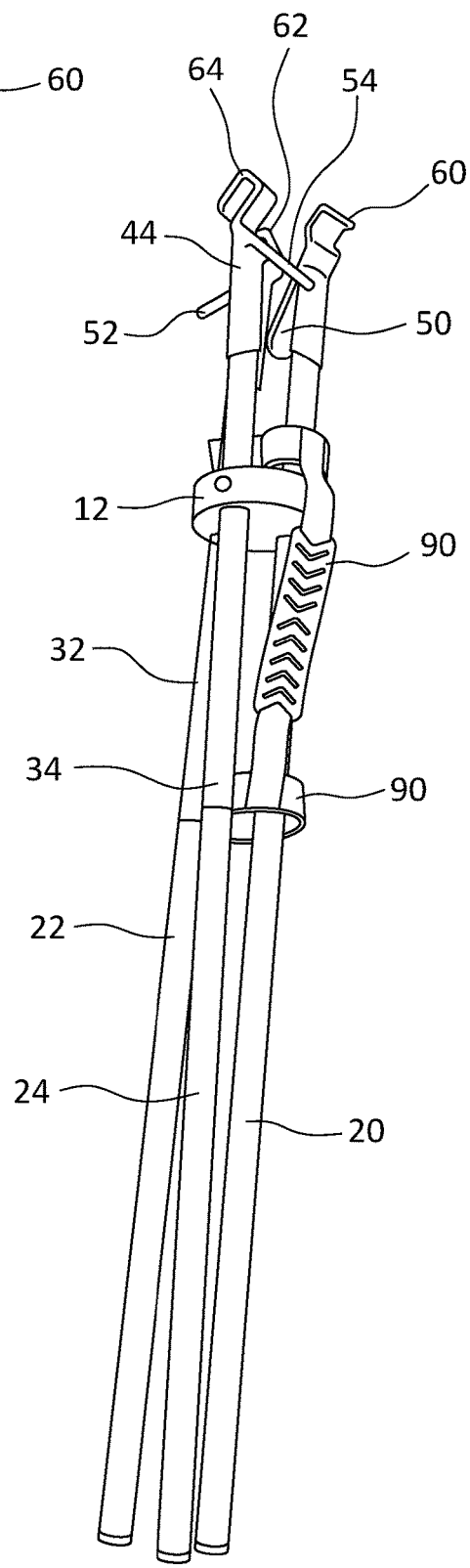
FIG. 5A
FIG. 6

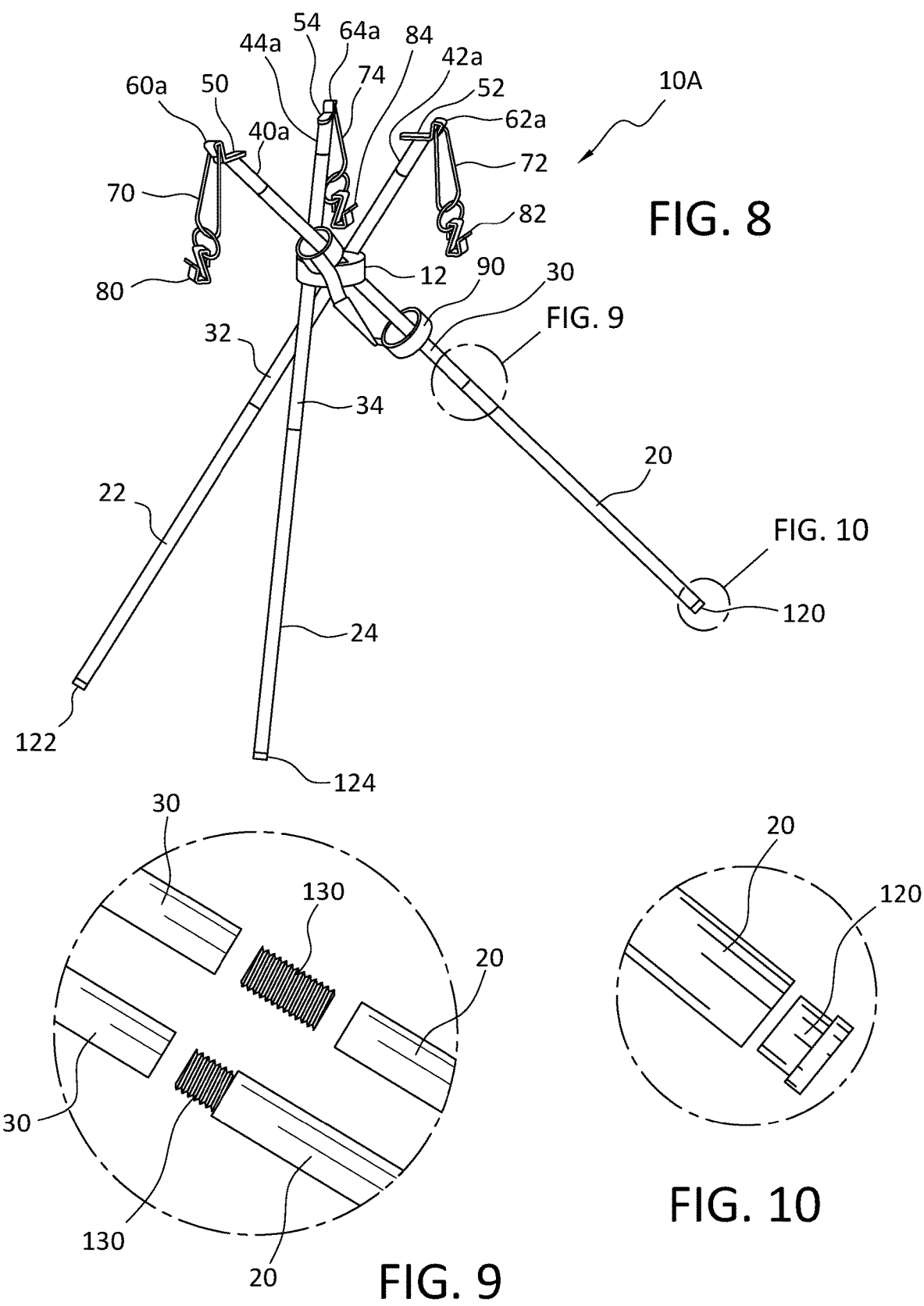

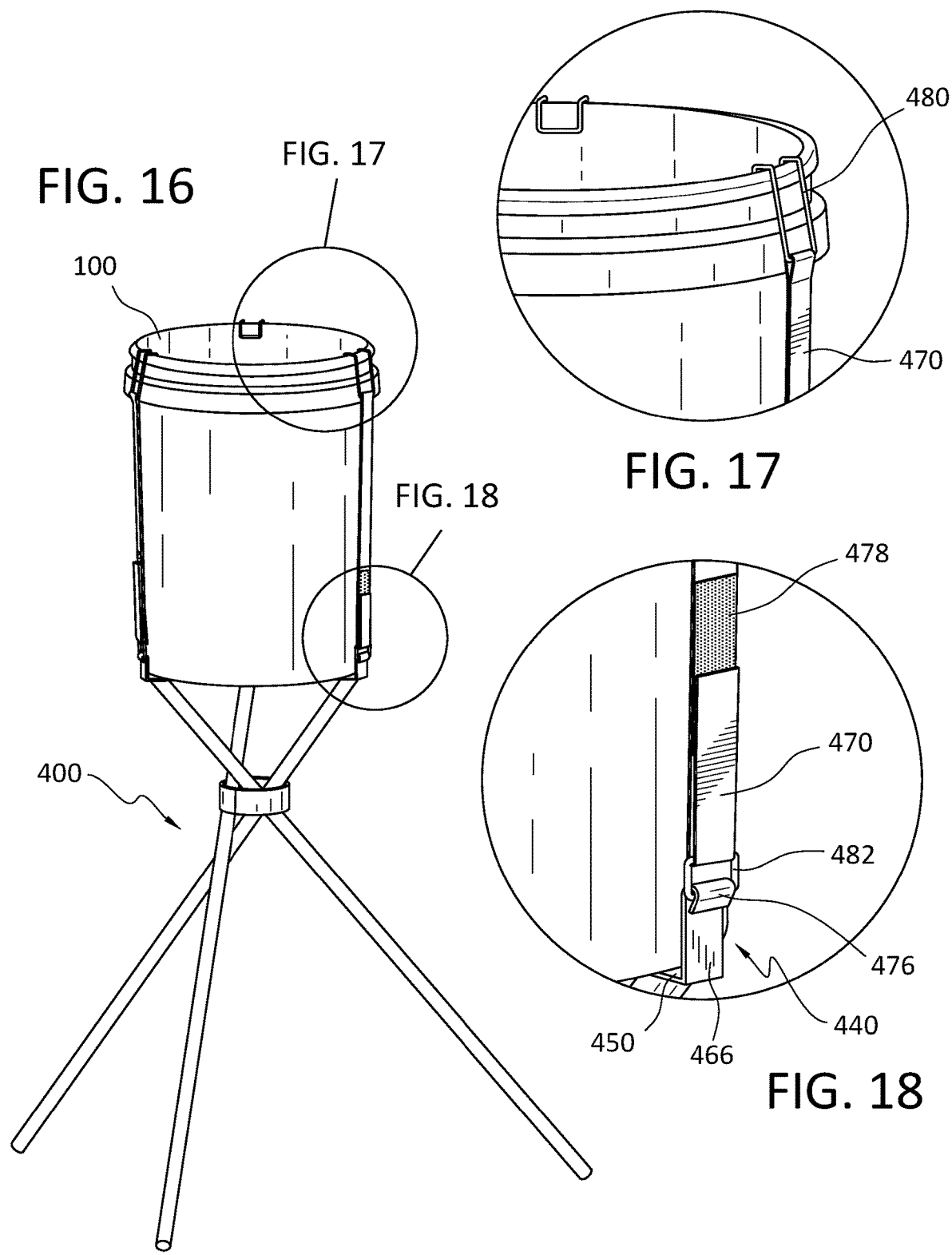

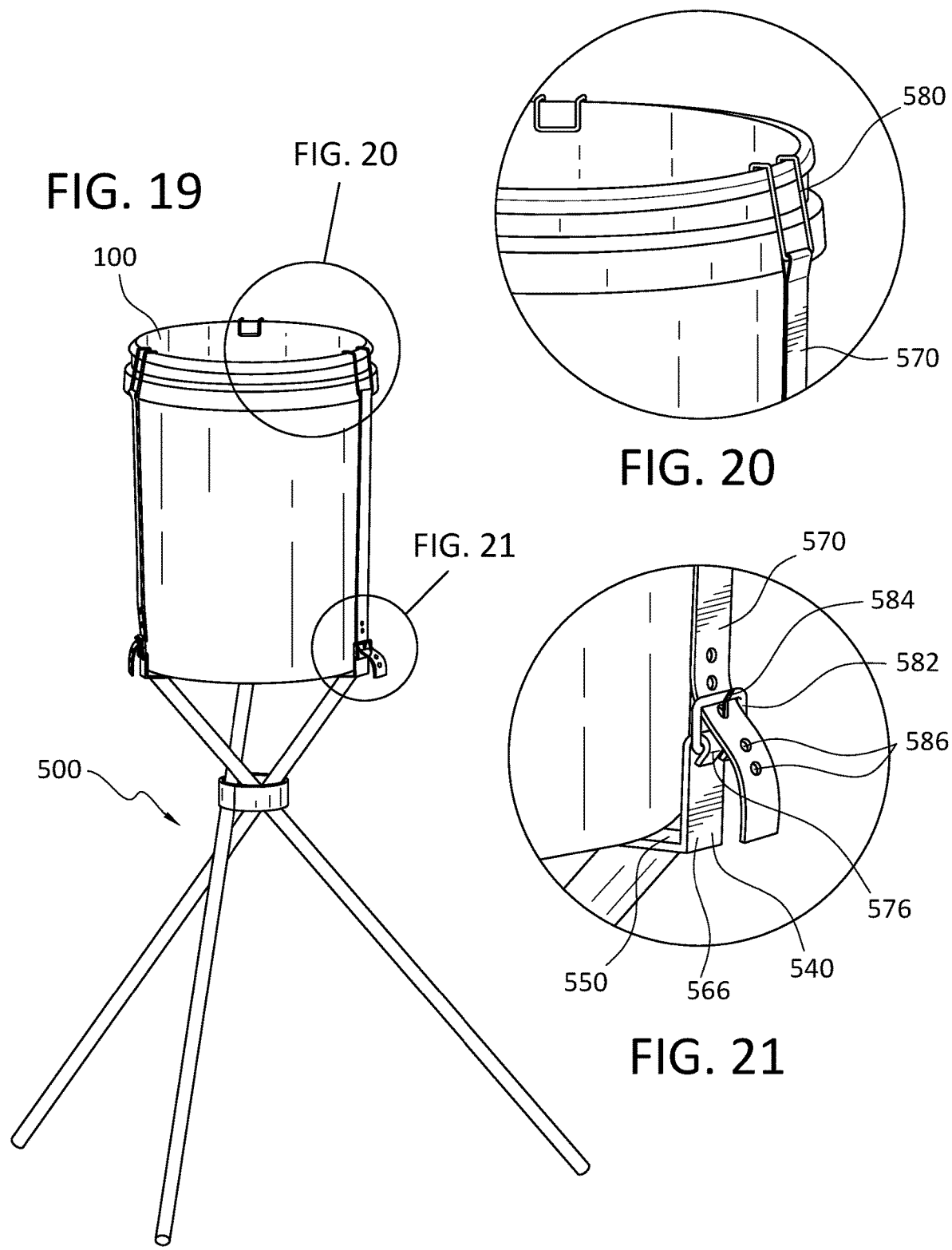

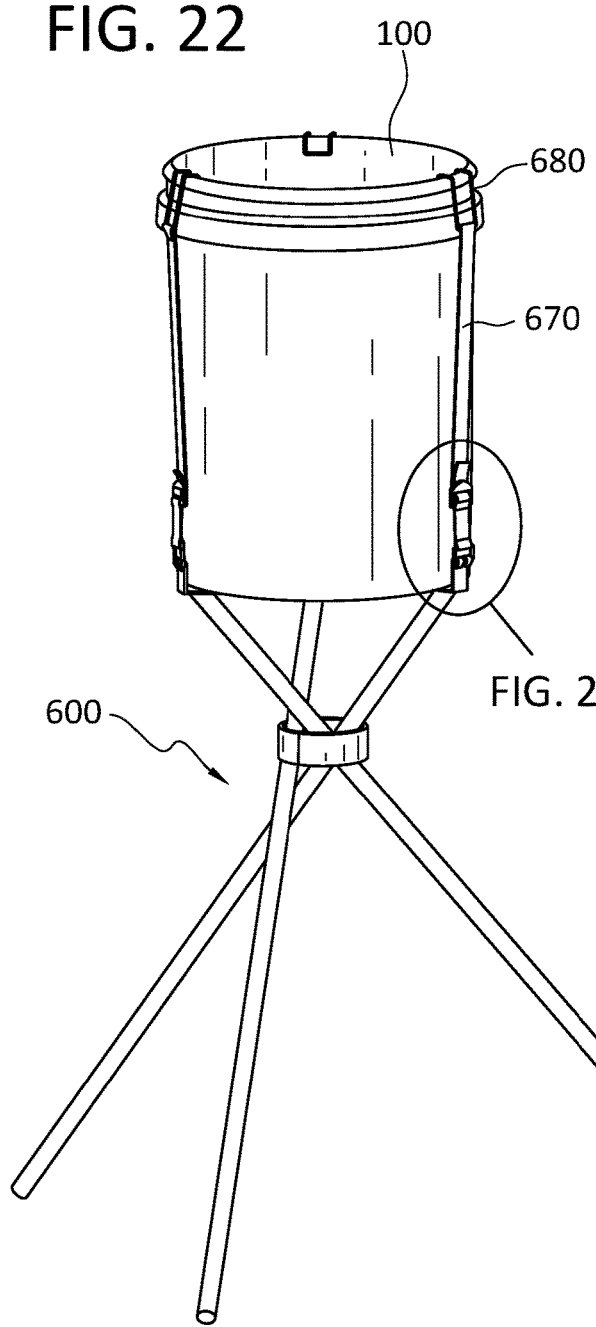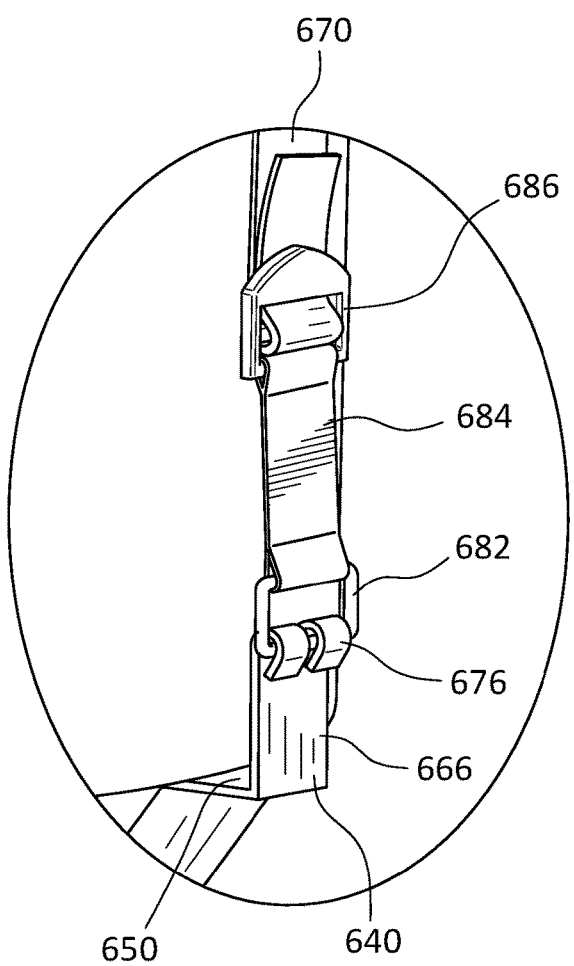

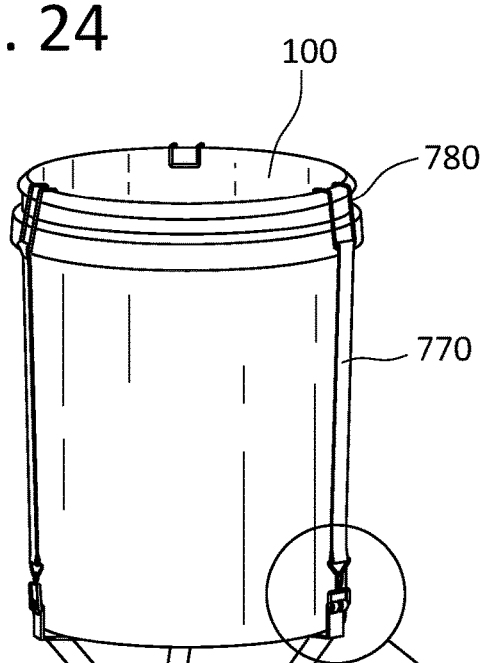
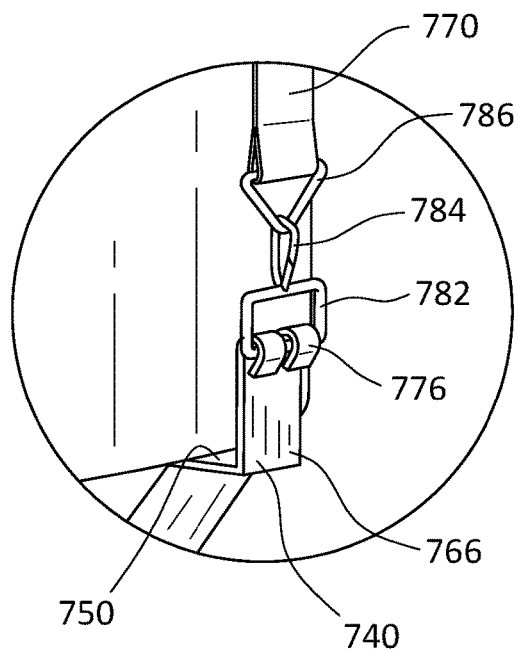
FIG. 24
FIG. 25

BUCKET CADDY

This application claims priority under 35 USC § 120 to U.S. application Ser. No. 16/374,799, entitled "Bucket Caddy", filed Apr. 4, 2019, status pending, which claims priority under 35 USC § 119(e) to U.S. Provisional Application Ser. No. 62/676,048, entitled "Bucket Caddy", filed May 24, 2018, the disclosures of each of which are incorporated by reference herein.

FIELD OF THE INVENTION

The present invention is generally directed to a stand to which a bucket or other receptacle may be attached to hold the bucket a distance above a horizontal support surface.

BACKGROUND OF THE INVENTION

Baseball and softball coaches and players toss or throw multiple balls to their team players for batting practice and defensive practice. Baseball and softball pitchers throw multiple balls in pitching practice. Frequently, a 5- or 6-gallon bucket that is filled with multiple balls is placed near a coach or player from which the coach or player may select a next ball for a practice toss, throw or pitch. In many cases, such bucket is seated on a ground surface, such that the coach or player must bend down to select the next ball from the bucket. Repetitive bending may unnecessarily stress the coach or player's back, and slows the rate of practice.

Stands to hold practice balls above a ground surface are known. Jugs Sports offers a "Back Saver Ball Basket" with a canvas "basket" container over a foldable cage that can hold practice balls above a ground surface. Although the product is marketed to hold the practice balls directly in the canvas container, the user has an option to place a bucket filled with balls into the canvas container reservoir. The bucket is not supported against movement or tilting when held in the basket.

Improvements to devices to hold practice balls continue to be sought.

BRIEF SUMMARY OF THE INVENTION

In a first embodiment of the invention, a bucket caddy or stand has a retainer defining at least three slot openings therethrough. Each slot opening receives one leg inserted through the slot opening. Each leg has a proximal end and a distal end and a central axis. Each leg has at its proximal end a shelf surface disposed at a first angle to the central axis and has a hook disposed with its opening at a second angle to the central axis. In this first embodiment elastic bands removably connect at one end to a respective hook and at their opposite end to a rim of the bucket to be held by the bucket caddy. The elastic bands each have a fastener, such as an S-shaped hook, at their opposite ends that is configured to removably connect to the bucket rim. As one option, the elastic bands may comprise two loops of elastic band material joined together at a center section, leaving a loop at one end and a loop with the S-shaped hook at the other end.

In a second embodiment, the elastic bands remain connected to the hooks at the proximal ends of the legs. The distal tip of each of the hooks is bent or crimped so as to retain the loop at the one end of the elastic band inside the hook.

In one embodiment, the shelf surfaces of the at least three legs each have a generally planar top surface and an opposite surface. In another embodiment, the shelf surfaces of the three legs each have a stepped top surface, with a first planar top surface portion and a second planar top surface portion separated by a bend in the top surface.

When the bucket caddy is in a bucket supporting configuration, the shelf surfaces of the at least three legs are directed radially inwardly toward the retainer, and preferably are disposed in a common plane. In the bucket supporting configuration, the hook openings of the at least three legs are directed toward the support surface on which the bucket caddy is supported.

In one embodiment, the shelves of the legs are formed of an elastic material or coated with an elastic material. In addition, in this embodiment the hooks of the legs are formed with an elastomeric material or coated with an elastomeric coating. Moreover, the fasteners (S-shaped hooks) joined to the elastic bands may be formed of an elastomeric material or coated with an elastomeric coating. For example, the shelves of the legs, the hooks of the legs, and the hooks joined to the elastic bands may be dip molded metal or a formed resin material.

Variations to secure the bucket to the shelves of the legs include straps that are not elastic bands, wherein the straps are provided with buckles, hook and loop fasteners, snaps, and/or hooks to allow the strap length to be adjusted to accommodate different size buckets on the bucket caddy, and/or a cinch to ensure a rigid and tight non-wobble fit. Alternatively, a hook attached to the top of a strap may be inserted into a slot opening or recess formed in the bucket. As still another alternative, three point connection to hold the bucket on the shelves of the legs of the bucket caddy is provided by carriage bolts or set screws secured through the fittings at the top of the legs with the bolt tips or screw tips contacting sidewalls of the bucket.

In the bucket supporting configuration, the legs are splayed apart with their central axes at angles to one another. In the storage configuration, with the bucket separated from the bucket caddy, the legs are disposed with their central axes parallel or substantially parallel to one another. A tape, such as a tape of Velcro or hook and loop fastener, may be joined at one end to one of the legs, and wrapped around the legs when the caddy is in its storage configuration. A handle for carrying the bucket caddy may be joined to one of the legs, such as the first leg.

BRIEF DESCRIPTION OF THE DRAWINGS

The foregoing summary, as well as the following detailed description of the disclosure, will be better understood when read in conjunction with the appended drawings. For the purpose of illustrating the disclosure, there is shown in the drawings an embodiment of a bucket caddy which is presently preferred. It should be understood, however, that the disclosure is not limited to the precise arrangements and instrumentalities shown. In the drawings:

FIG. 3 is a right front perspective view of the bucket held to the bucket caddy of FIG. 1 showing connection of the bucket to the bucket caddy with an elastic band having a hook over the bucket lip and having an end linked to a U-shaped hook at the top of one leg of the bucket caddy;

FIG. 4 is a partial left side elevational view of the elastic band having a hook over the bucket lip and having an end linked to a U-shaped hook at the top of one leg of the bucket caddy of FIG. 1;

FIG. 5A is an enlarged view of the top of one leg of the bucket caddy of a variant with stepped shelf surfaces;

FIG. 6 is a right front perspective view of the bucket caddy of FIG. 1 in a folded configuration for storage;

FIG. 8 is a right front perspective view of the bucket caddy of FIG. 7 without the bucket connected thereto;

FIG. 9 is an enlarged detail of the connection of the lower leg portion to the upper leg portion of the bucket caddy of FIG. 8;

FIG. 10 is an enlarged detail of the foot connected to the bottom of the lower leg portion of the bucket caddy of FIG. 8;

FIG. 16 is a right front perspective view of a fifth embodiment of a bucket caddy in a support configuration holding a bucket above a horizontal support surface;

FIG. 17 is an enlarged detail showing one end of a strap with hook extending therefrom, which hook is engaged over a rim of the bucket, to secure the bucket to the bucket caddy of FIG. 16;

FIG. 18 is an enlarged detail showing the opposite end of the strap with hook and loop fastener strips applied to portions of a face of the strap, and with the strap threaded through a loop engaged to the hook of the fitting on the top portion of a leg of the bucket caddy of FIG. 16;

FIG. 19 is a right front perspective view of a sixth embodiment of a bucket caddy in a support configuration holding a bucket above a horizontal support surface;

FIG. 20 is an enlarged detail showing one end of a strap with hook extending therefrom, which hook is engaged over a rim of the bucket, to secure the bucket to the bucket caddy of FIG. 19;

FIG. 21 is an enlarged detail showing the opposite end of the strap with a buckle with a buckle frame engaged with the fitting on the top portion of a leg of the bucket caddy of FIG. 19, and with a buckle prong that engages with holes formed in the strap;

FIG. 22 is a right front perspective view of a seventh embodiment of a bucket caddy in a support configuration holding a bucket above a horizontal support surface;

FIG. 23 is an enlarged detail showing a buckle joined to a strap, with the buckle frame secured by a second strap and a loop to a fitting on the top portion of the leg of the bucket caddy of FIG. 22;

FIG. 24 is a right front perspective view of an eighth embodiment of a bucket caddy in a support configuration holding a bucket above a horizontal support surface;

FIG. 25 is an enlarged detail showing a loop from which a hook projects to engage a fitting on one end of a strap, wherein the loop is joined to a fitting on the top portion of a leg of the bucket caddy of FIG. 24;

DESCRIPTION OF THE DISCLOSURE

Certain terminology is used in the following description for convenience only and is not limiting. Unless specifically set forth herein, the terms "a," "an" and "the" are not limited to one element, but instead should be read as meaning "at least one." The terminology includes the words noted above, derivatives thereof and words of similar import.

It also should be understood that the terms "about," "approximately," "generally," "substantially" and like terms, used herein when referring to a dimension or characteristic of a component of the invention, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Figure 1:
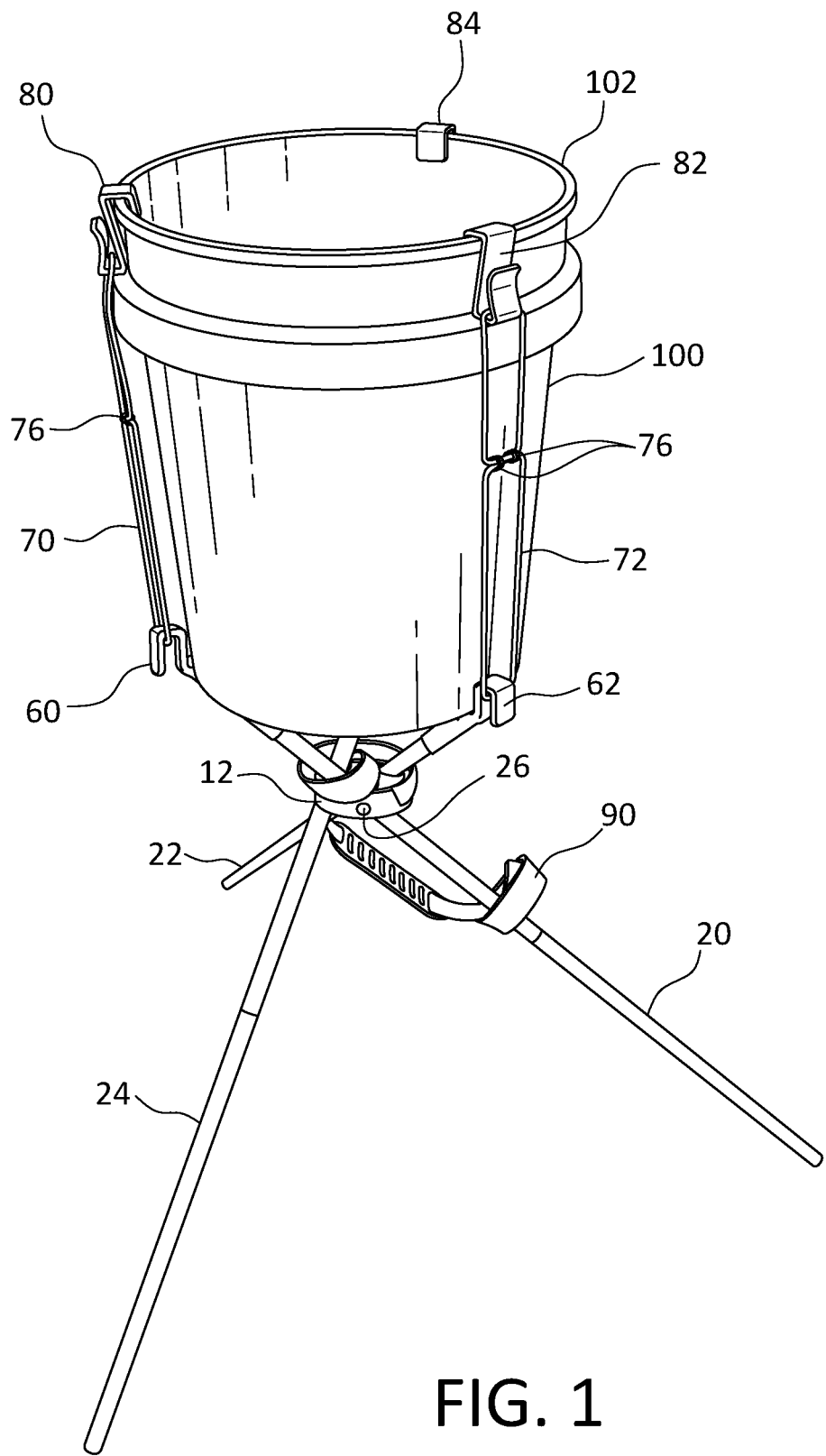
FIG. 1 is a right front perspective view of a first embodiment of a bucket caddy in a support configuration holding a bucket above a horizontal support surface.

Referring to the drawings in detail, FIGS. 1-6 show a first embodiment of a bucket caddy 10 according to the invention. A retainer 12 has three slot openings 14, 16, 18 in which the first, second and third legs 20, 22, 24 are held. The legs 20, 22, 24 may be pivoted on pins or fasteners 26, 28 across each respective slot opening and extending through the legs. The legs 20, 22, 24 pivot from a bucket-supporting configuration, as shown in FIG. 1, to a storage configuration as shown in FIG. 6.

Fittings 40, 42, 44 are installed on the top portions 30, 32, 34 of the legs 20, 22, 24. The fittings 40, 42, 44 each have a shelf surface 50, 52, 54 that extends away from the center axis of the respective fitting at an angle a thereto. When the bucket caddy 10 is in the bucket-supporting configuration, the shelf surfaces 50, 52, 54 are disposed generally in a same or substantially same plane and are thus configured to support thereon a bottom surface of the bucket 100.

The fittings 40, 42, 44 terminate at their distal ends at hooks 60, 62, 64, which are generally U-shaped in this embodiment The U-shaped hooks 60, 62, 64 each receive a respective elastic cord or bungie 70, 72, 74 used to engage the bucket 100 to the bucket caddy 10. A single loop of elastic cord or bungie could be used. Preferably, as shown in FIGS. 1, 3 and 4, the elastic cords or bungies are double cords, with two loops of elastic cords joined together with a crimp fastener 76. The double cords have enhanced strength as compared a single loop cord.

Fasteners such as S-shaped hooks 80, 82, 84 are joined to the opposite ends of the elastic cords or bungies 70, 72, 74. As shown in FIG. 4, the S-shaped hooks 80, 82, 84 grip the upper rim 102 of the bucket 100. The bucket 100 is secured to the caddy 10 with three elastic bands 70, 72, 74. Each band 70, 72, 74 loops through the generally U-shaped hook portion 60, 62, 64 of a leg, and the S-shaped hook portion 80, 82, 84 at the opposite end of the band 70, 72, 74 grips the upper rim 102 of the bucket 100. To release the bucket 100 from the bucket caddy 10, the U-shaped hooks 80, 82, 84 may be lifted up and away from the rim 102 of the bucket 100, and the elastic bands 70, 72, 74 may be separated from the U-shaped hook portions 60, 62 64.

Figure 4A:
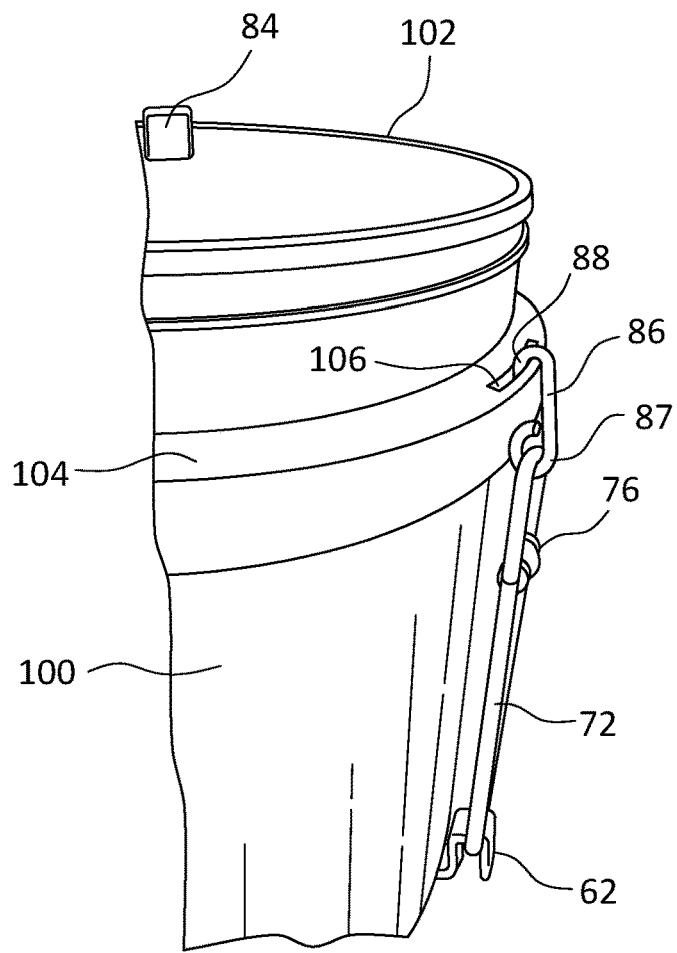
FIG. 4A is a partial left side elevational view of an alternative embodiment of the bucket caddy of FIG. 1 in which the elastic band has a hook secured into a slot formed in a top portion of the bucket and has an end linked to a U-shaped hook at the top of one leg of the bucket caddy

FIG. 4A shows an alternative fastener that may be used, a J-shaped hook 86. The J-shaped hook 86 has its proximal end 87 connected to the bungie 72 and the hook tip at its distal end 88 is inserted into a slot 106 or recess formed through a shoulder 104 of the bucket 100. To release the bucket 100 from the bucket caddy 10, the tip of the J-shaped hook 86 may be lifted out of the slot 106 and the bottom end of the bungie 72 may be separated from the U-shaped hook 62.

Figure 2:
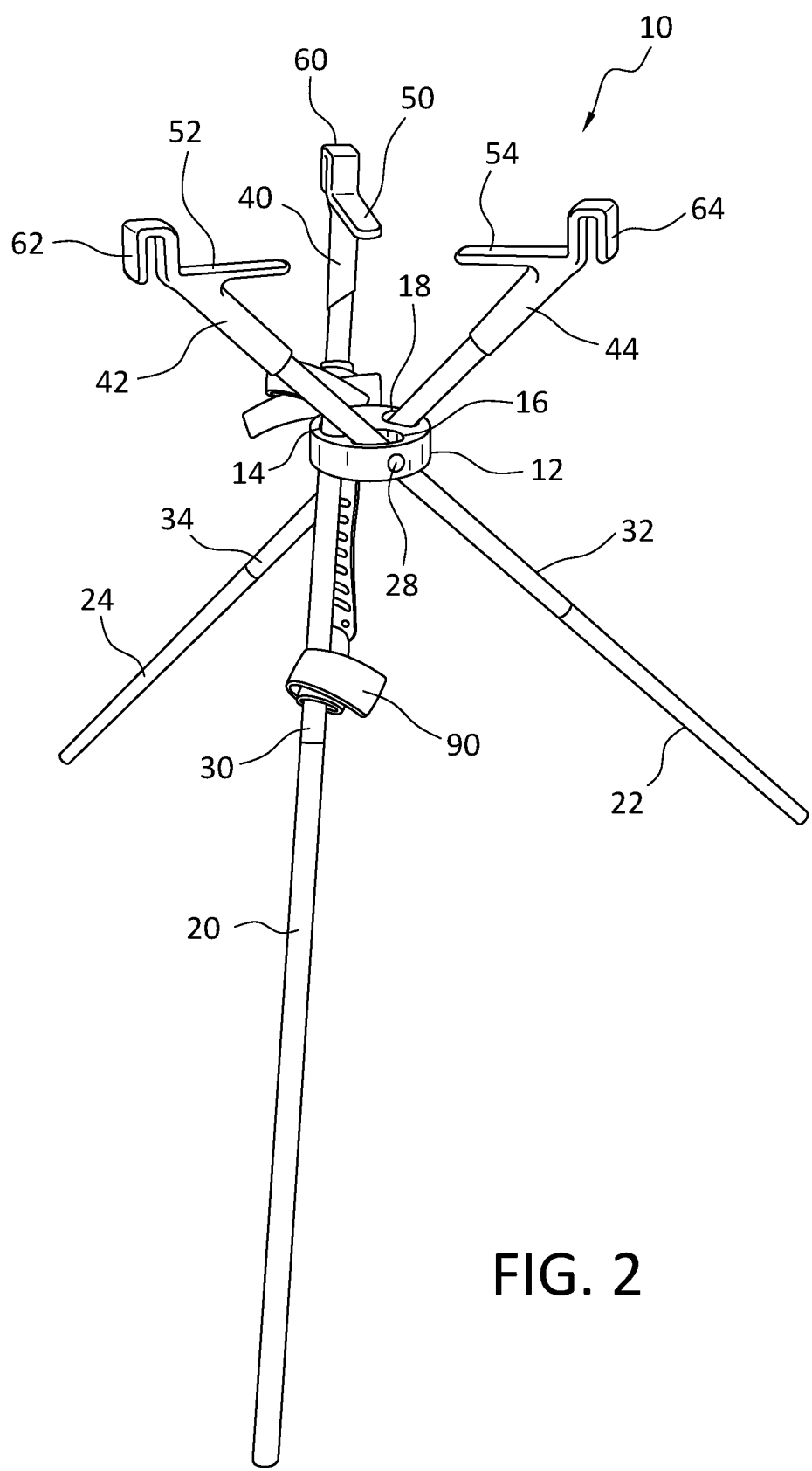
FIG. 2 is a right front perspective view of the bucket caddy of FIG. 1 without the bucket connected thereto.

FIG. 2 shows the bucket caddy in the bucket-support configuration. The three legs 20, 22, 24 are held in individual slots 14, 16, 18 in the disc-shaped retainer 12. The legs 20, 22, 24 are movable, e.g., pivotable or rotatable, from a storage configuration such as shown in FIG. 6 to the support configuration such as shown in FIG. 2. Each leg 20, 22, 24 defines its own central axis along its length. In the storage configuration, the central axes of the legs 20, 22, 24 are parallel or generally parallel to one another. In the support configuration, the central axes of the legs 20, 22, 24 are at angles to one another, with the legs 20, 22, 24 splayed apart to create a tripod or stand. In one embodiment, in the support configuration, the center axes of the legs 20, 22, 24 are at angles in a range of from 20 degrees to 70 degrees from vertical, more preferably from 40 degrees to 50 degrees from vertical. The leg height is sufficient to hold the shelf surfaces 50, 52, 54 about 15 to 55 inches, more preferably about 25 to 35 inches, above the horizontal support surface, such as the ground. Preferably, the leg height is sufficient to hold the shelf surfaces 50, 52, 54 from 25 to 55 inches, or more preferably from 28 to 30 inches, above the horizontal support surface. For example, the legs 20, 22, 24 may be 30 to 34 inches long. Each leg 20, 22, 24 has at its distal end a footing to contact the ground or support surface.

Figure 5:
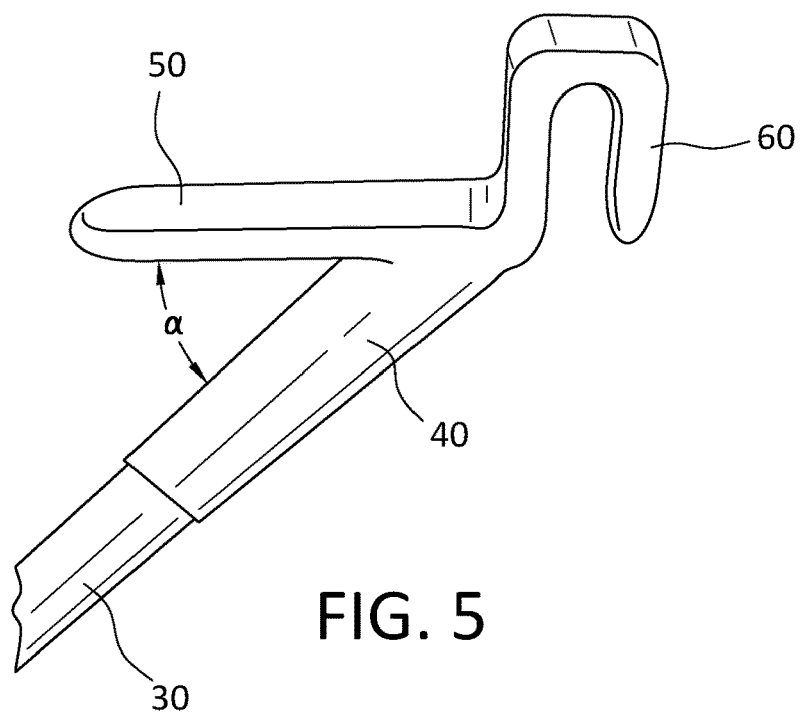
FIG. 5 is an enlarged view of the top of one leg of the bucket caddy of FIG. 1 showing the shelf and the U-shaped hook.
Figure 7:
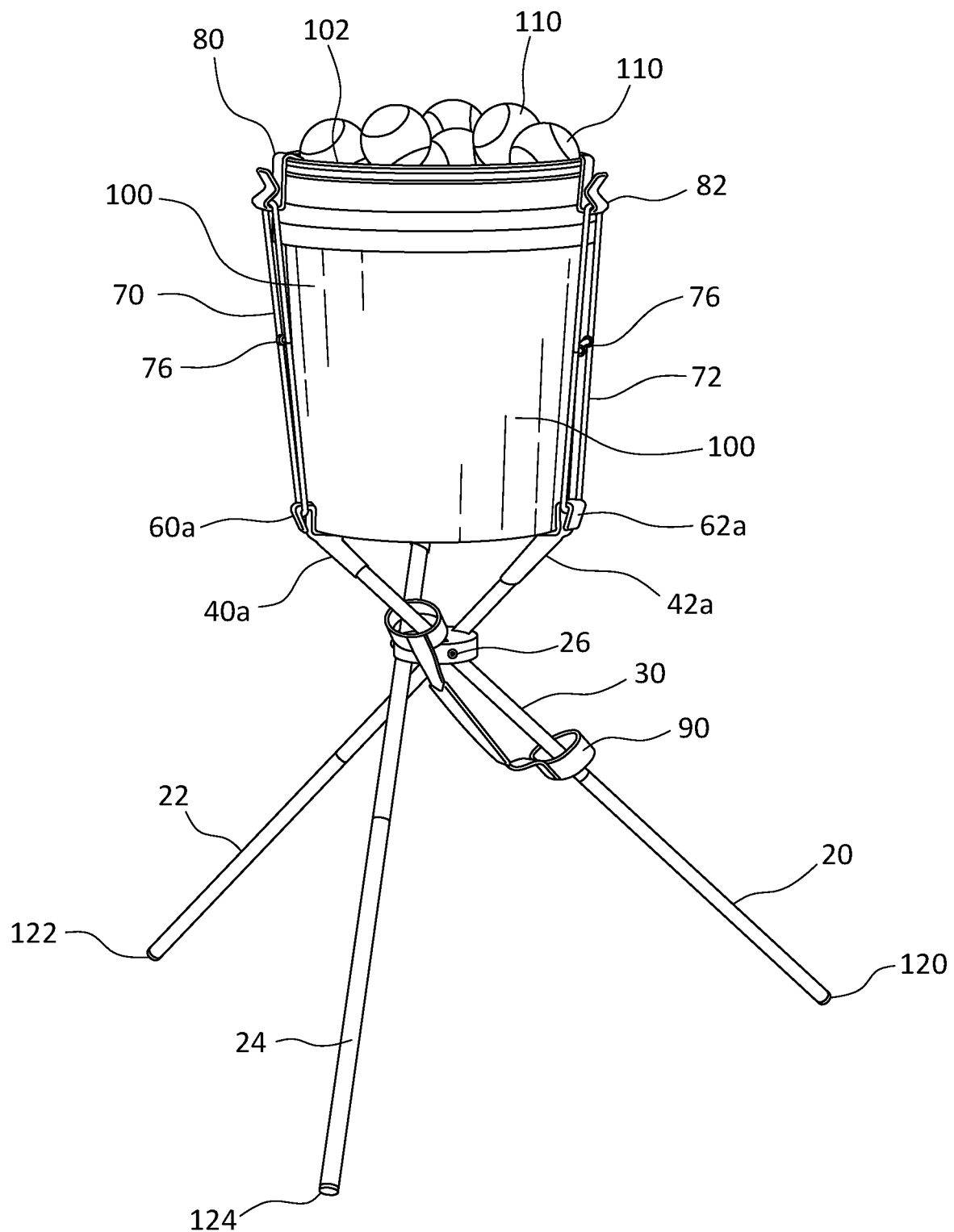
FIG. 7 is a right front perspective view of a second embodiment of a bucket caddy in a support configuration holding a bucket above a horizontal support surface.

Referring to FIG. 5, each leg 20, 22, 24 has at its proximal end 30 a fitting 40 that has a shelf surface 50 that is disposed at an angle a to the central axis of the leg 20. Preferably, the angle a is in the range from 20 to 90 degrees. Each leg 20, 22, 24 further has a generally U-shaped hook 60 at its proximal end. The generally U-shaped hook 60 is disposed at an angle to the central axis of the leg 20. Preferably, the angle is in the range from 20 to 90 degrees. The U-shaped hook 60 may be positioned at a rear portion of the shelf 50. The shelf 50 and U-shaped hook 60 may comprise a unitary element joined to the proximal end 30 of the leg 20, 22, 24.

When the legs 20, 22, 24 are splayed to the support configuration, the shelf surfaces 50, 52, 54 are directed radially inwardly toward the retainer 12 and the tops of the shelf surfaces 50, 52, 54 are held in a common plane. The shelf surfaces 50, 52, 54 of this embodiment are flat, and adapted to receive the bottom of the large bucket 100. The generally U-shaped hook openings 60, 62, 64 are pointed with the open side directed toward the ground or support surface.

Alternatively, the shelf surfaces 50, 52, 54 of the legs maybe stepped, such that a first top shelf portion 50a may be adapted to receive the bottom of a large bucket, but the stepped lower shelf portion 50b may be adapted to receive the bottom of a smaller bucket having a smaller diameter or footprint, such as a paint can. See FIG. 5A showing such an alternative shelf surface with a top shelf portion 50a and a stepped lower shelf portion 50b having a shelf surface in a plane different from the plane of the shelf surface of the top shelf portion 50a, with the top shelf portion 50a separated from the lower shelf portion 50b by a bend, or by a separate extension piece secured to the alternative shelf.

The legs 20, 22, 24 may be formed of a metal, such as steel, or of a composite, such as fiberglass. For example, the legs may be of tubular metal having a diameter of 16 mm with a wall thickness of 1.2 mm with a length of 800 mm. The legs 20, 22, 24 may be formed in two sections, e.g., 20 and 30, 22 and 32 and 24 and 34, with the bottom section threadedly engagable to the top section, such as a top section of 400 mm length and a bottom section of 400 mm length.

Each shelf 50, 52, 54 may be formed of metal, such as steel, and coated with an elastomeric coating. Each shelf alternatively may be formed of an elastomer or a plastic resin, such as a rubber or ABS. Preferably, the shelf top surface is grip-able or tacky. Each shelf may be formed of dip-molded metal to create the gripping or frictional engagement between the bottom of the bucket and the shelf that prevents the bucket from sliding. A shelf formed of sheet steel that is dip molded with an elastomeric coating is preferred.

Different sized buckets in terms of bucket diameter or footprint may be accommodated on the shelf due to the frictional engagement of the elastomeric coating with the bucket bottom. More particularly, for the embodiment with stepped shelf surfaces, a smaller diameter bucket may be accommodated on the lower stepped surface. With or without the stepped shelf surfaces, different sized buckets in terms of bucket height may be held on the caddy due to the flexible nature of the elastic band or bungee cord attachments to the hooks of the shelves.

The hooks 60, 62, 64 may be formed of metal, such as steel, and coated with an elastomeric coating. The hooks 60, 62, 64 alternatively may be formed of an elastomer or a plastic resin, such as rubber, ABS or fiberglass.

The elastic bands 70, 72, 74 preferably are bungee cords with a diameter from 0.2 to 0.5 inch and a length of from about 2 to 18 inches, preferably from about 10 to 12 inches. A single bungie loop may be used. A double bungie loop such as shown in FIGS. 1, 3 and 4 is preferred for added strength.

A Velcro tape or hook and loop fastener tape 90 is appended to the first leg 20. When in the storage configuration shown in FIG. 6, the tape 90 may be wrapped around all three of the legs 20, 22, 24 to secure the legs with their leg axes in a parallel or substantially parallel orientation. The tape 90 may also form a handle by which the bucket caddy 10 may be carried when in the storage configuration.

Referring next to the embodiment shown in FIGS. 7-10, an alternative bucket caddy 10A is shown. In these figures, the structural elements are identified with the identical reference numbers where the elements are the same as those of the embodiment of FIGS. 1-6. The bucket caddy 10A is shown in bucket support configuration in FIGS. 7 and 8. Baseballs 110 are held inside the bucket 100 that is supported on the bucket caddy 10A. Different from the first embodiment, the bucket caddy 10A has different fittings 40a, 42a, 44a with shelf surfaces 50, 52, 54 at the top of the legs 20, 24, 26. The fittings 40a, 42a, 44a feature generally U-shaped hooks 60a, 62a, 64a with terminal ends thereof that are more closely crimped to the fitting side surfaces so that the elastic cords or bungies 70, 72, 74 are retained in the U-shaped hooks 60a, 62a, 64a. In the first embodiment (FIGS. 1-6) the elastic cords or bungies 70, 72, 74 were separable from the U-shaped hooks 60, 62, 64. In the second embodiment (FIGS. 7-10) the elastic cords or bungies 70, 72, 74 are intended to remain held in the U-shaped hooks 60a, 62a, 64a.

The top portions of the legs 30, 32, 34 are joined to the bottom portions of the legs 20, 22, 24 with threaded fittings 130. In this embodiment as shown in FIG. 9, the top portions of the legs 30, 32, 34 are internally threaded tubes, and the bottom portions of the legs 20, 22, 24 are internally threaded tubes. The fitting 130 has external threads that join to each of the threaded sections of the tubes. The legs 20, 22, 24 alternatively could comprise telescoping leg extensions to vary the leg height.

Footers 120, 122, 124 may be joined to the bottom ends of the legs 20, 22, 24. As shown in FIG. 10, the footer 120 is inserted into the hollow tube end of the leg 20 and held therein with an interference fit.

Figures 11, 12:
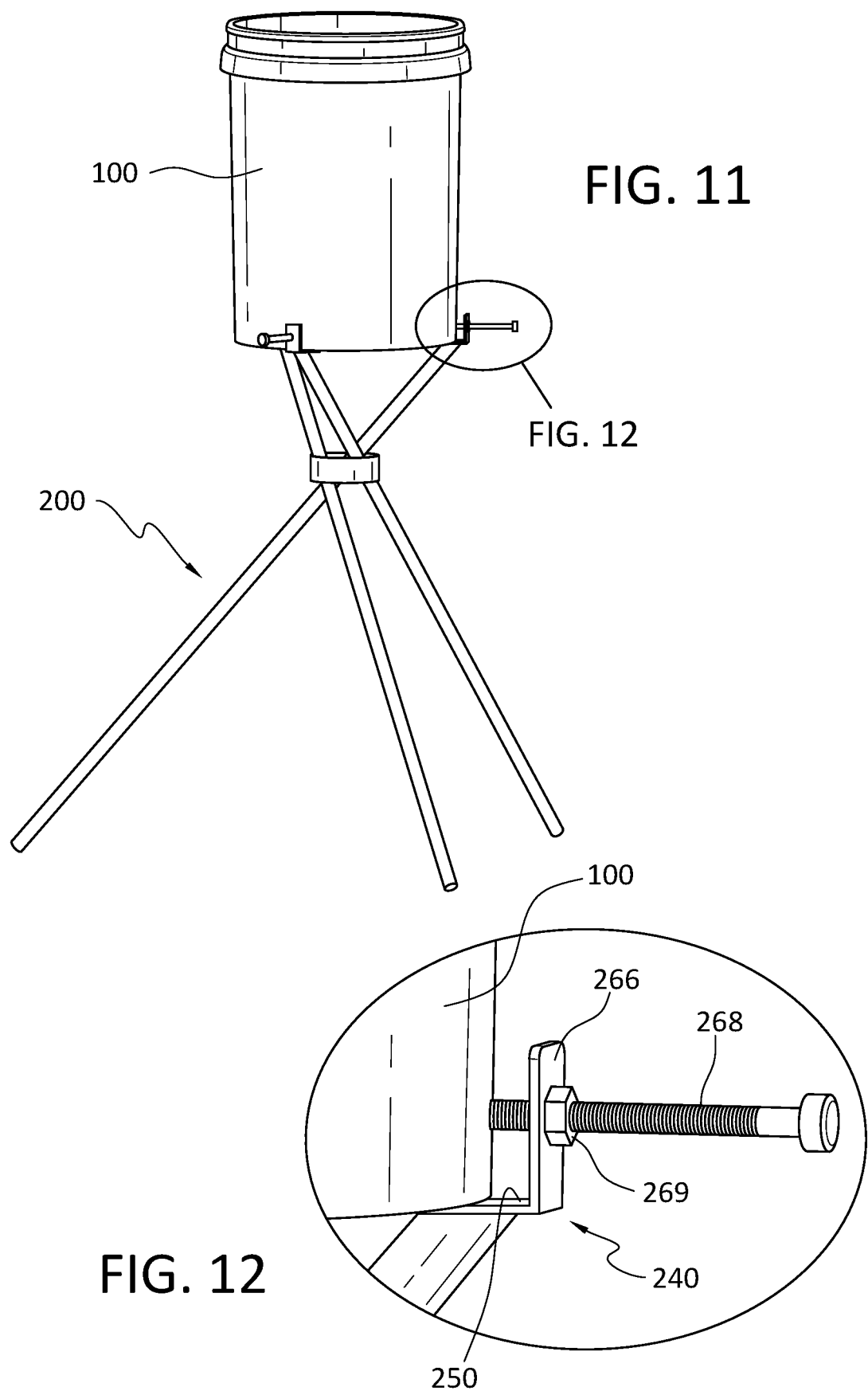
FIG. 11 is a right front perspective view of a third embodiment of a bucket caddy in a support configuration holding a bucket above a horizontal support surface.
FIG. 12 is an enlarged detail showing connection of the bucket to the bucket caddy of FIG. 11 by one of three carriage bolt or cap screw fasteners.

In the embodiment shown in FIGS. 11 and 12, the bucket 100 is secured to a bucket caddy 200 by contact points extending from the leg fittings 240. Each leg fitting 240 has a shelf 250 configured to support a bottom surface of the bucket 100. An upstanding wall 266 projects away from the shelf 250 and defines at least one hole therethrough. A carriage bolt 268 or screw is threaded through the hole so that the distal end of the bolt makes contact with the sidewall of the bucket 100. A nut 269 facilitates tightening the carriage bolt 268 in a desired location. In the embodiment shown, a carriage bolt 268 is associated with an upstanding wall 266 of each leg fitting 240, so that three points of contact are made against the sidewall of the bucket 100. As an alternative, holes may be drilled through each U-shaped hook 60, 62, 64 such as shown in the embodiment of FIGS. 1-6, and the carriage bolts 268 could then be inserted through such holes to provide three point contact to secure the bucket 100 to the bucket caddy 10.

Figure 13:
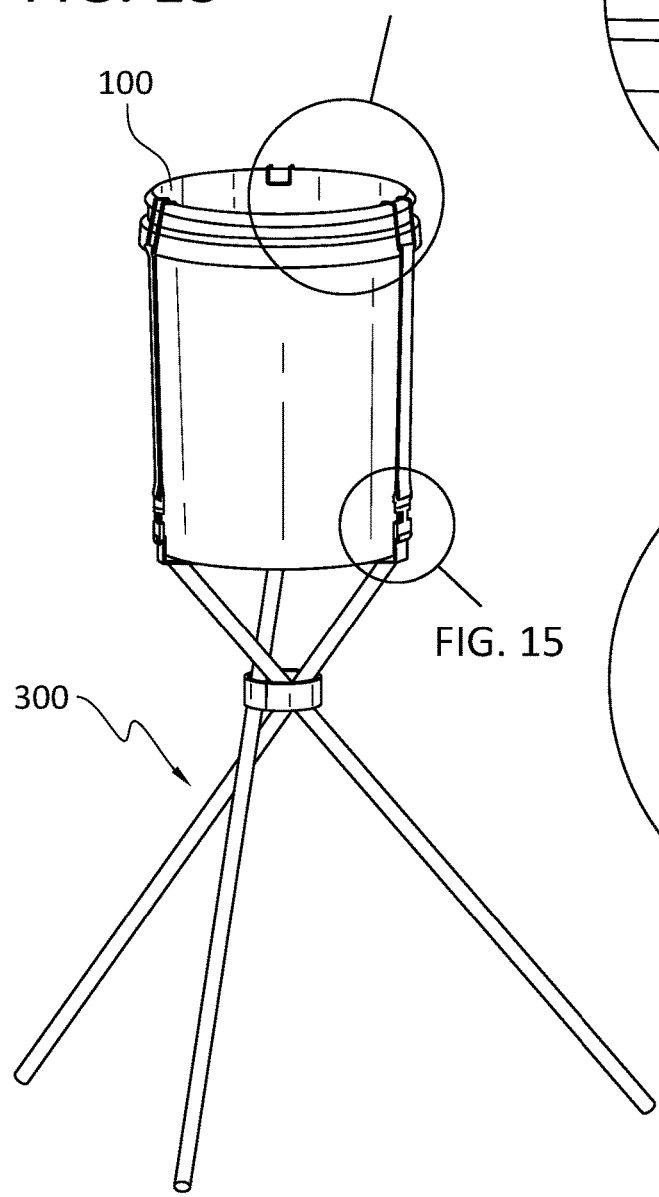
FIG. 13 is a right front perspective view of a fourth embodiment of a bucket caddy in a support configuration holding a bucket above a horizontal support surface.
Figure 14:
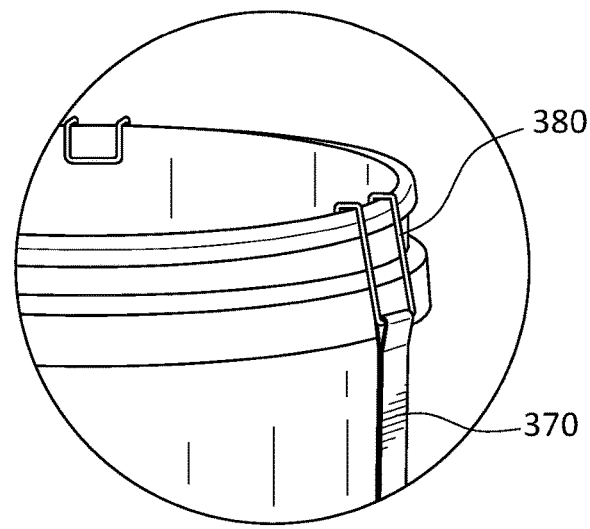
FIG. 14 is an enlarged detail showing one end of a strap with hook extending therefrom, which hook is engaged over a rim of the bucket, to secure the bucket to the bucket caddy of FIG. 13.
Figure 15:
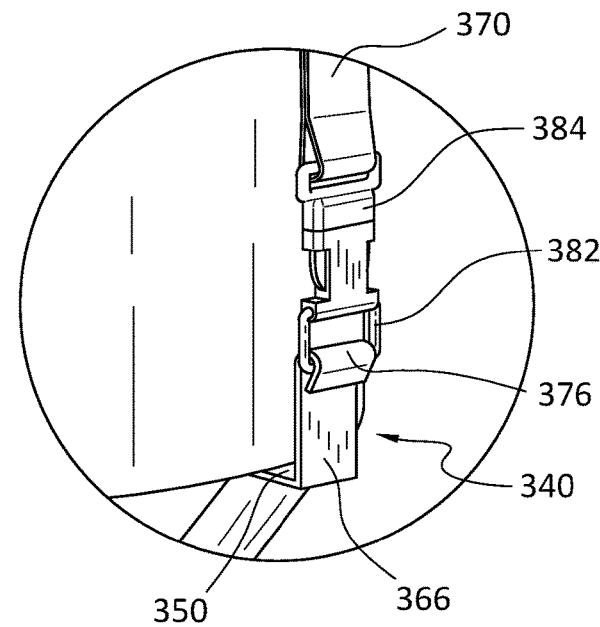
FIG. 15 is an enlarged detail showing the opposite end of the strap with a buckle clip extending therefrom, which buckle has a loop engaged to the hook of the fitting on the top portion of a leg of the bucket caddy of FIG. 13.

In the embodiment shown in FIGS. 13-15, the bucket 100 is secured to a bucket caddy 300 with length adjustable straps 370. Each leg fitting 340 has a shelf 350 configured to support a bottom surface of the bucket 100. A hook 380 is joined to one end of the strap 370. A crimped hook 376 associated with an upstanding wall 366 one of the leg fittings 340 holds a ring 382 for a receiving end of a buckle clip 384. While a crimped hook 376 is shown in FIGS. 13-15, another alternative would be a hook that is not crimped. The buckle clip 384 is attached to the opposite end of the strap 370. The buckle clip 384 may be detached from the receiving end to detach the strap 370 from the bucket caddy 300.

In the embodiment shown in FIGS. 16-18, the bucket 100 is secured to a bucket caddy 400 with length adjustable straps 470. Each leg fitting 440 has a shelf 450 configured to support a bottom surface of the bucket 100. A hook 480 is joined to one end of the strap 470. A ring 482 is held by crimped hook 476 associated with the upstanding wall 466 of the leg fitting 440. The opposite end of the strap 470 is looped through the ring 482. Hook and loop fastener strips 478 are present on one face of such strap, and are secured together to adjust the length of the strap 470 as it secures the bucket 100 to the bucket caddy 400.

In the embodiment shown in FIGS. 19-21, the bucket 100 is secured to a bucket caddy 500 with length adjustable straps 570. Each leg fitting 540 has a shelf 550 configured to support a bottom surface of the bucket 100. A hook 580 is joined to one end of the strap 570. A ring 582 is held by crimped hook 576 associated with the upstanding wall 566 of the leg fitting 540. The opposite end of the strap 570 defines holes 586 to receive a prong 584 of the buckle formed with the ring 582 and prong 584. The length of the strap 570 is adjusted by engaging the prong 584 with a desired hole 586 as the strap 570 secures the bucket 100 to the bucket caddy 500.

In the embodiment shown in FIGS. 22 and 23, the bucket 100 is secured to a bucket caddy 600 with length adjustable straps 670. Each leg fitting 640 has a shelf 650 configured to support a bottom surface of the bucket 100. A hook 680 is joined to one end of the strap 670. A ring 682 is held by crimped hook 676 associated with the upstanding wall 666 of the leg fitting 640. A portion of a cinch fastener 684 is attached to the ring 682. The opposite end of the strap 670 is threaded onto the other portion of the cinch fastener 686. The opposite end of the strap 670 may be pulled through the cinch 686 to tighten the strap (reduce the length of the strap) to secure the strap 670 to the bucket 100 and hold the bucket 100 on the bucket caddy 600.

In the embodiment shown in FIGS. 24 and 25, the bucket 100 is secured to a bucket caddy 700 with straps 770. Alternatives to the straps 770 include cords and ropes. A hook 780 is joined to one end of the strap 770. A ring 782 is held by a crimped hook 776 associated with the upstanding wall 766 of the leg fitting 740. A hook connector 784 extends from the ring 782. The opposite end of the strap 770 has a triangular ring 786 configured to engage with the hook connector 784. The strap 770 may be removably joined to the hook connector 784 by engaging the triangular ring 786 to the hook connector 784. The triangular ring 786 may be shaped in a form other than triangular and still be received by the hook connector 784.

Figures 26, 27:
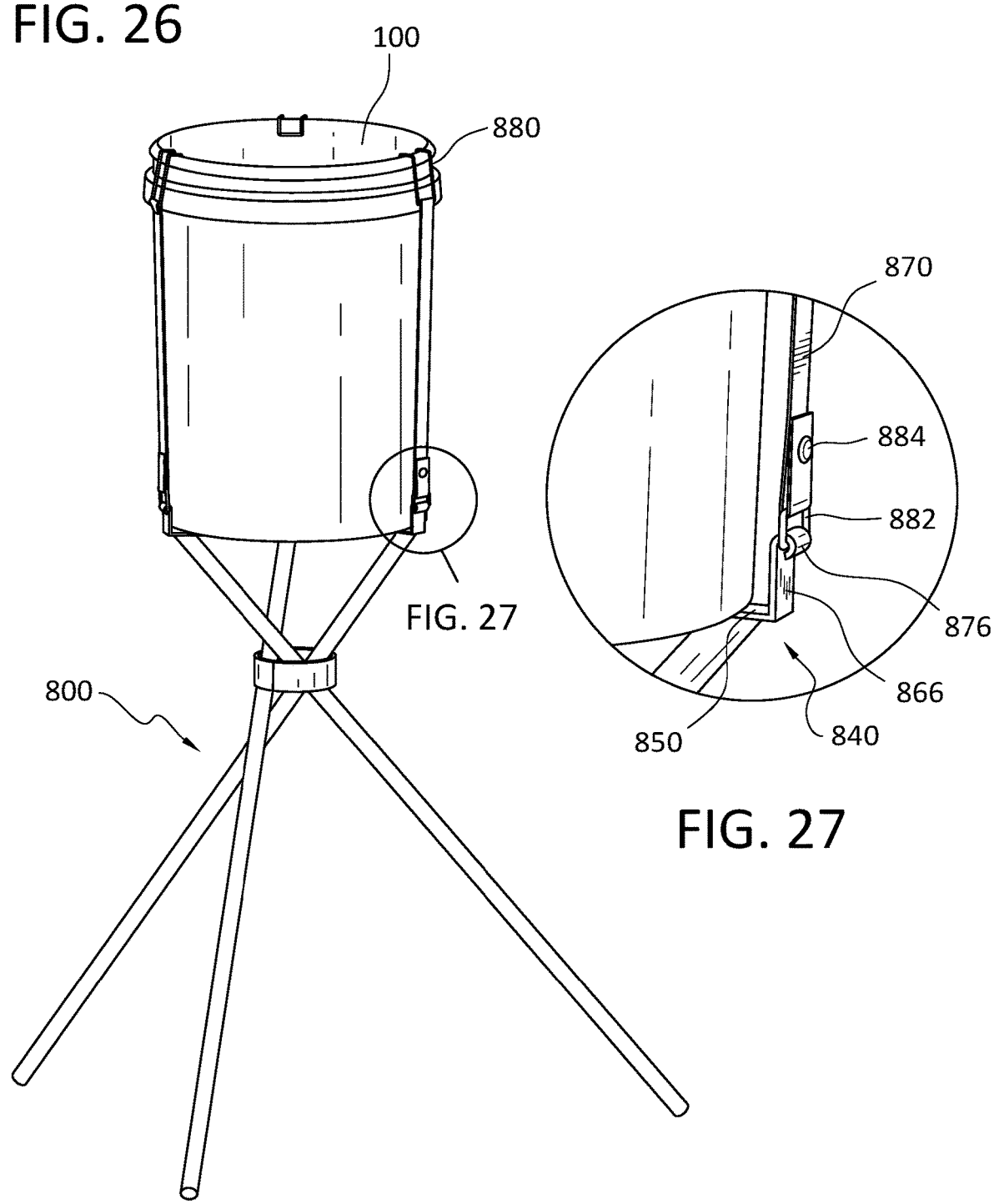
FIG. 26 is a right front perspective view of a ninth embodiment of a bucket caddy in a support configuration holding a bucket above a horizontal support surface.
FIG. 27 is an enlarged detail showing a snap fitting near one end of a strap, wherein the strap is threaded through a loop that is joined to a fitting on the top portion of a leg of the bucket caddy of FIG. 26.

In the embodiment shown in FIGS. 26-27, the bucket 100 is secured to a bucket caddy 800 with length adjustable straps 870. Each leg fitting 840 has a shelf 850 configured to support a bottom surface of the bucket 100. A hook 880 is joined to one end of the strap 870. A ring 882 is held by crimped hook 876 associated with the upstanding wall 866 of the leg fitting 840. The opposite end of the strap 870 is looped through the ring 882. Snap fasteners 884 are present on such strap 870, and are secured together to adjust the length of the strap 870 as it secures the bucket 100 to the bucket caddy 800. Multiple snap fasteners 884 may be present along the length of each strap 870 so that the length of the strap 870 may be selectively varied according to choice of snap fastener that is connected together.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the present disclosure as defined by the appended claims.

REFERENCE NUMERALS 10 bucket caddy
10A bucket caddy
12 retainer
14 slot opening
16 slot opening 18 slot opening
20 first leg
22 second leg
24 third leg
26 pivot
28 pivot
30 top portion of first leg
32 top portion of second leg
34 top portion of third leg
40 fitting on first leg
42 fitting on second leg
44 fitting on third leg
50, 50a, 50b shelf, shelf top portion, shelf bottom portion
52 shelf
54 shelf
60 U-shaped hook
60A U-shaped hook
62 U-shaped hook
62A U-shaped hook
64 U-shaped hook
64A U-shaped hook
70 elastic cord
72 elastic cord
74 elastic cord
76 crimp
80 S-shaped hook
82 S-shaped hook
84 S-shaped hook
86 J-shaped hook
87 proximal end of J-shaped hook
88 distal end of J-shaped hook
90 fastener tape
100 bucket
102 bucket rim
104 bucket shoulder
106 slot in bucket shoulder
110 baseball
120 footer
122 footer
124 footer
130 fastener
200 bucket caddy
240 fitting on first leg
250 shelf
266 upstanding wall
268 carriage bolt or screw
269 nut
300 bucket caddy
340 fitting on first leg
350 shelf
366 upstanding wall
370 strap
376 crimp or crimped hook
380 hook
382 ring
384 buckle clip
400 bucket caddy
440 fitting on first leg
450 shelf
466 upstanding wall
470 strap
476 crimp or crimped hook
478 hook strip of hook and loop fastener
480 hook
482 ring
500 bucket caddy
540 fitting on first leg
550 shelf
566 upstanding wall
570 strap
576 crimp or crimped hook
580 hook
582 buckle ring
584 buckle prong
586 holes in strap
600 bucket caddy
640 fitting on first leg
650 shelf
666 upstanding wall
670 strap
676 crimp or crimped hook
682 ring
684 strap portion of cinch
686 cinch buckle
700 bucket caddy
740 fitting on first leg
750 shelf
766 upstanding wall
770 strap
782 ring
784 hook projecting from ring
786 triangular ring
800 bucket caddy
840 fitting on first leg
850 shelf
866 upstanding wall
870 strap
876 crimp or crimped hook
882 ring
884 snap fastener

We claim:

1. A bucket caddy, comprising:
a retainer defining at least three slot openings therethrough;
a first leg inserted into the first slot opening, said first leg having a proximal end and a distal end and a central axis, said first leg having at its proximal end a shelf surface disposed at a first angle to the central axis and having a first hook disposed with its opening at a second angle to the central axis;
a second leg inserted into the second slot opening, said second leg having a proximal end and a distal end and a second leg central axis, said second leg having at its proximal end a second leg shelf surface disposed at a first angle to the second leg central axis and having a second hook disposed with its opening at a second angle to the second leg central axis;
a third leg inserted into the third slot opening, said third leg having a proximal end and a distal end and a third leg central axis, said third leg having at its proximal end a third leg shelf surface disposed at a first angle to the third leg central axis and having a third hook disposed with its opening at a third angle to the third leg central axis;
a first strap or elastic band configured to connect at one end with the first hook opening, and having a fastener at its opposite end configured to removably connect to a rim or top portion of a bucket;
a second strap or elastic band configured to connect at one end with the second hook opening, and having a second fastener at its opposite end configured to removably connect to the rim or top portion of the bucket; and
a third strap or elastic band configured to connect at one end with the third hook opening, and having a third fastener at its opposite end configured to removably connect to the rim or top portion of the bucket.

2. The bucket caddy of claim 1, wherein the shelf surface, the second leg shelf surface and the third leg shelf surface each have a generally planar top surface and an opposite surface.

3. The bucket caddy of claim 1, wherein the shelf surface, the second leg shelf surface and the third leg shelf surface each have a stepped top surface, with a first planar top surface portion and a second planar top surface portion.

4. The bucket caddy of claim 1, wherein the first fastener, second fastener and third fastener each have an S-shape with a first curved portion and a second curved portion that is configured to hold a respective one of the straps or elastic bands in the first curved portion and to grippingly connect to the rim of the bucket with the second curved portion.

5. The bucket caddy of claim 1, wherein the first fastener, second fastener and third fastener are hook-shaped and have a distal end, which distal end is configured to matingly secure to a slot or recess formed in the bucket.

6. The bucket caddy of claim 1, wherein each of the first strap or elastic band, second strap or elastic band and third strap or elastic band is length-adjustable.

7. The bucket caddy of claim 1, wherein the first strap or elastic band comprises an elastic band with two loops of bungee cord joined together.

8. The bucket caddy of claim 6 further comprising a first strap length-adjusting fastener configured to adjust strap length of the first strap.

9. The bucket caddy of claim 8, wherein the first strap length-adjusting fastener is selected from the group consisting of: one or more buckles, buckle clips, hook and loop fasteners, one or more snap fasteners, one or more cinches, and one or more hook fasteners.

10. The bucket caddy of claim 1, wherein when the bucket caddy is in a bucket supporting configuration, the shelf surface of the first leg is directed radially inwardly toward the retainer, the second leg shelf surface is directed radially inwardly toward the retainer, and the third leg shelf surface is directed radially inwardly toward the retainer.

11. The bucket caddy of claim 10, wherein the first leg shelf surface, the second leg shelf surface and the third leg shelf surface are disposed in a common plane when the bucket caddy is in the bucket supporting configuration.

12. The bucket caddy of claim 1, wherein when the bucket caddy is in a bucket supporting configuration, the first hook opening is directed toward a support surface on which the bucket caddy is supported, the second hook opening is directed toward the support surface on which the bucket caddy is supported; and the third hook opening is directed toward the support surface on which the bucket caddy is supported.

13. The bucket caddy of claim 1, wherein the first leg shelf, the second leg shelf and the third leg shelf are formed of an elastomeric material or coated with an elastomeric coating.

14. The bucket caddy of claim 1 wherein the first hook, the second hook and the third hook are formed with an elastomeric material or coated with an elastomeric coating.

15. The bucket caddy of claim 1, wherein the first leg defines a first side, the second leg defines a second side, and the third leg defines a third side, and wherein the first hook has a terminal end crimped toward the first side, the second hook has a second terminal end crimped toward the second side, and the third hook has a terminal end crimped toward the third side.

16. The bucket caddy of claim 1, wherein the first leg, second leg and third leg are splayed apart with their central axes at angles to one another when the bucket caddy is in the support configuration, and the first leg, second leg and third leg are disposed with their central axes parallel or substantially parallel when the bucket caddy is in a storage configuration.

17. The bucket caddy of claim 1, further comprising a tape of hook and loop fastener material joined at one end to one of the first leg, second leg or third leg and having an opposite end, said tape configured to wrap around the first leg, second leg and third leg when the caddy is in a storage configuration.

18. The bucket caddy of claim 1, wherein the first elastic band is configured to removably connect at one end with the first hook opening, the second elastic band is configured to removably connect at one end with the second hook opening, and the third elastic band is configured to removably connect at one end with the third hook opening.

19. The bucket caddy of claim 1, wherein the first hook of the first leg is bent so that a distal end contacts or nearly contacts a side surface of the first leg.

20. The bucket caddy of claim 1, further comprising a bucket or container.

21. A bucket caddy, comprising:
a retainer defining at least three slot openings therethrough;
a first leg inserted into the first slot opening, said first leg having a proximal end and a distal end and a central axis, said first leg having at its proximal end a shelf surface disposed at a first angle to the central axis and having an upstanding wall projecting away from the shelf surface;
a second leg inserted into the second slot opening, said second leg having a proximal end and a distal end and a second leg central axis, said second leg having at its proximal end a second leg shelf surface disposed at a first angle to the second leg central axis and having a second upstanding wall projecting away from the second leg shelf surface;
a third leg inserted into the third slot opening, said third leg having a proximal end and a distal end and a third leg central axis, said third leg having at its proximal end a third leg shelf surface disposed at a first angle to the third leg central axis and having a third upstanding wall projecting away from the third leg shelf surface; and
adjustable means extending from at least two of the upstanding walls and configured to contact a sidewall of a bucket or container to be supported on the bucket caddy.

22. The bucket caddy of claim 21, wherein the adjustable means comprises:
a first bolt or screw inserted through a hole in the upstanding wall projecting away from the first leg shelf surface, with a distal end of the first bolt or screw configured to contact a sidewall of a bucket or container to be supported on the bucket caddy;
a second bolt or screw inserted through a hole in the upstanding wall projecting away from the second leg shelf surface, with a distal end of the second bolt or screw configured to contact the sidewall of the bucket or container to be supported on the bucket caddy; and
a third bolt or screw inserted through a hole in the third upstanding wall projecting away from the third leg shelf surface, with a distal end of the third bolt or screw configured to contact the sidewall of the bucket or container to be supported on the bucket caddy.

23. The bucket caddy of claim 21, further comprising the bucket or container.

* * * * *